United States Patent [19]

Pietzsch et al.

[11] 4,379,542
[45] Apr. 12, 1983

[54] SUSPENSION MEANS FOR MOUNTING AN INSTRUMENT SUSCEPTIBLE TO SHOCK

[75] Inventors: Ludwig Pietzsch, Max-Beckmann-Str. 27, 7500 Karlsruhe 41, Fed. Rep. of Germany; Rudolf Hartmann, Karlsbad-Auerbach, Fed. Rep. of Germany

[73] Assignee: Ludwig Pietzsch, Karlsruhe, Fed. Rep. of Germany

[21] Appl. No.: 63,774

[22] Filed: Aug. 6, 1979

[30] Foreign Application Priority Data

Oct. 10, 1978 [DE] Fed. Rep. of Germany ....... 2844114

[51] Int. Cl.³ .............................................. F16M 13/00
[52] U.S. Cl. .................................. 248/561; 248/573; 248/634
[58] Field of Search ...................... 248/27.1, 561, 573, 248/574, 611, 634; 267/124, 129, 141.3

[56] References Cited

U.S. PATENT DOCUMENTS

| 2,219,882 | 1/1950 | Barkalow | 248/573 |
| 2,508,139 | 5/1950 | Binney | 248/634 X |
| 2,646,958 | 7/1953 | Coykendall | 248/611 |
| 2,660,386 | 11/1953 | Munro | 248/574 |
| 2,660,387 | 11/1953 | Roy | 248/574 |
| 2,923,505 | 2/1960 | Immendorf | 248/561 |
| 3,008,703 | 11/1961 | Slemmons et al. | 248/631 X |
| 3,460,210 | 8/1969 | Ellis | 248/561 X |
| 4,069,992 | 1/1978 | Lada | 248/573 X |
| 4,214,738 | 7/1980 | Casper | 248/573 X |

FOREIGN PATENT DOCUMENTS

| 356643 | 10/1961 | Switzerland | 248/561 |
| 1229875 | 4/1971 | United Kingdom | 248/561 |

Primary Examiner—William H. Schultz
Attorney, Agent, or Firm—L. Lawton Rogers, III

[57] ABSTRACT

A suspension means for mounting an instrument or the like which is susceptible to shock on a movable carrier, in particular a vehicle, comprises a flexible sealing means adapted to absorb shocks in at least one direction and further comprises a blocking device for rigid coupling of said instrument with said carrier, the blocking device being actuable by a drive means which works in said one direction against the resiliency of the sealing means.

21 Claims, 2 Drawing Figures

SUSPENSION MEANS FOR MOUNTING AN INSTRUMENT SUSCEPTIBLE TO SHOCK

The invention relates to a suspension means for mounting an instrument or the like which is susceptible to shock on a movable carrier, in particular a vehicle.

The invention is aimed at providing a suspension means which requires little structural expenditure and fulfills the following main objects:
  effective suspension and damping of the instrument so as to protect it, above all, from shocks,
  gas and liquid tightness,
  providing for the possibility to rigidly coupling of the instrument with the carrier.

In order to meet the above objects it is provided, in accordance with the invention, that the instrument is supported on the carrier by a flexible sealing means which may be flexible at least in axial direction and that, for rigid coupling of the instrument with the carrier, a blocking device is adapted to be brought into blocking position by a drive means against the resiliency of the sealing means.

A particularly simple structural embodiment of the invention is characterized in that the flexible sealing means comprises two coaxial, radially spaced rubber-elastic sealing rings which are placed under bias between annular surfaces of an inner ring connected with the instrument and an outer ring assembly connected with the carrier and radially define a cavity adapted to be filled with pressure fluid, in particular compressed air to act as the drive. The drive means is constituted in very simple manner by the inner ring which is required anyway to support the sealing rings and which is urged axially into blocking position, in the manner of a piston, against the restoring action inherent in the sealing rings by virtue of their elasticity by a pressure fluid, preferably pressurized air, which is introduced into the cavity which is radially limited by the two sealing rings.

The blocking device preferably comprises equally spaced stopping pins, e.g. three stopping pins spaced around the periphery of the inner ring and adapted to be engaged with corresponding receiving elements in the outer ring assembly under the action of the drive.

A particularly advantageous feature of this design of the blocking device may be realized by individual adjustability of the individual stopping pins. This permits optimum blocked position of the instrument to be obtained with respect to the carrier so that unloading of the suspension means is possible, for instance, when the carrier, such as a vehicle, is at rest.

The sealing rings may be received in force lock between frustoconical surfaces of the rings so that they tend to have rolling contact with the surfaces during axial relative movement.

In accordance with another solution, which is still simpler, as regards the manufacture and assembly thereof, the sealing rings are vulcanized to the annular surfaces of the inner ring and of the outer ring assembly, the inner ring being divided into two parts in a radial plane.

BRIEF DESCRIPTION OF THE DRAWINGS

The invention will be described further, by way of two preferred examples, with reference to the accompanying drawings, in which.

DETAILED DESCRIPTION OF THE PREFERRED EMBODIMENTS

Figure 1:
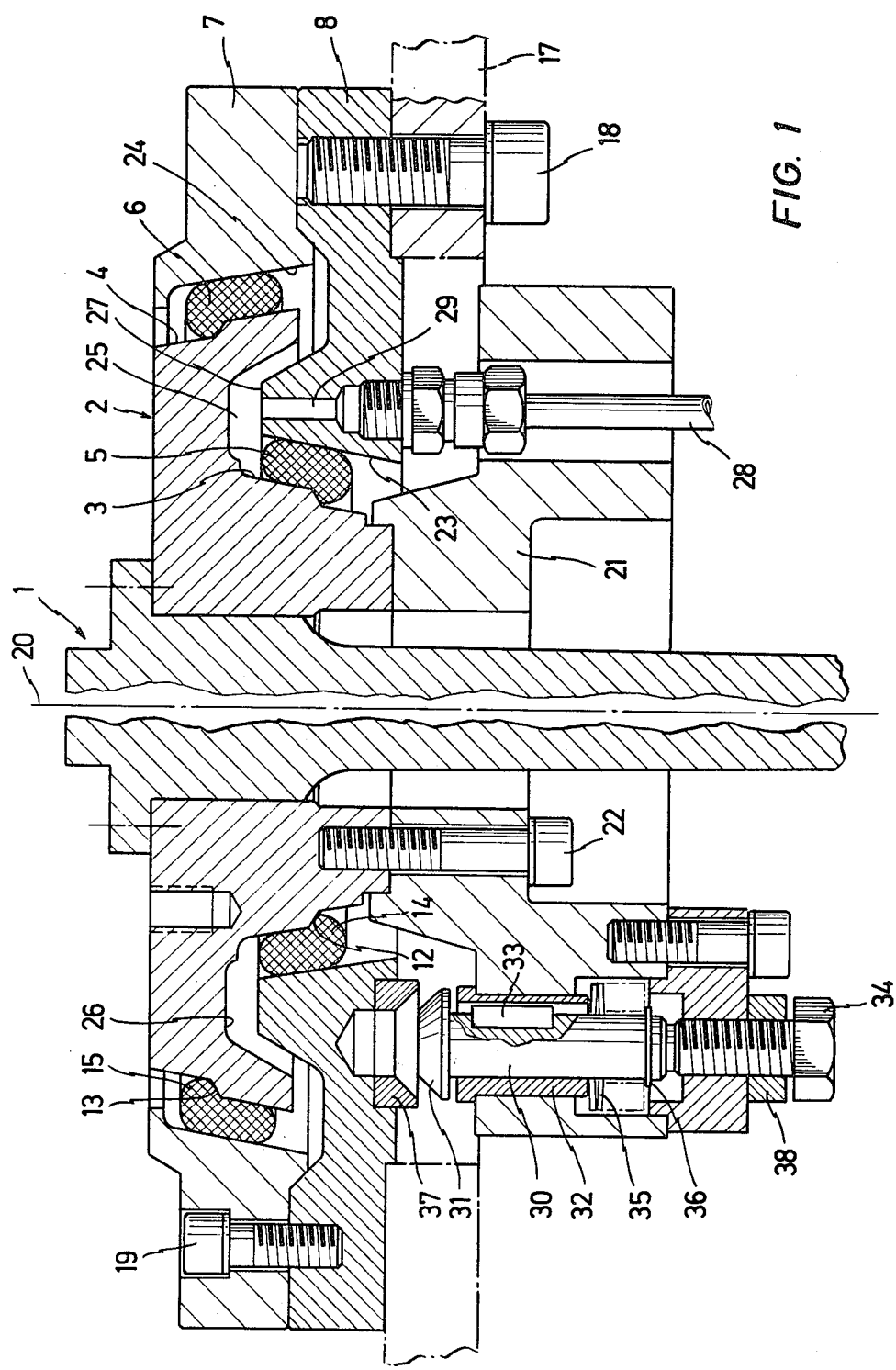
FIG. 1 is an axial sectional view of a suspension means according to the invention, in which the instrument to be suspended is shown in part only and radially shortened for reasons of space.

The instrument 1 to be suspended is screw-connected with an inner ring 2. The inner ring has oppositely inclined frustoconical surfaces 3 and 4 at its inner and outer circumference, respectively, which include steps at 12 and 13. Rubber rings 5, 6 which comprise shoulders 14, 15 for abutment against the steps in assembled deformed condition under bias or, perhaps, already in undeformed state, are disposed in abutment against the frustoconical surfaces 3, 4. They support the inner ring 2 against two outer rings 7 and 8 which are interconnected by means of screws 19 and connected to a carrier 17 by means of screws 18. The steps 12, 13 and shoulders 14, 15 serve to facilitate the assembly and have a certain retaining action between the rubber rings 5, 6 and the inner ring 2. The outer rings 7, 8 are provided with a smooth continuous frustoconical surface 24 and 23, respectively, to support the rubber rings 5, 6. The frustoconical surface 23 extends approximately parallel to the frustoconical surface 3 and the frustoconical surface 24 extends approximately parallel to the frustoconical surface 4. When the inner ring 2 is loaded axially, e.g. by the weight of the instrument 1, the rubber rings 5 and 6 roll between the frustoconical surfaces 3, 4 of the inner ring 2 and the frustoconical surfaces 23, 24 of the outer rings 7 and 8. This changes the thickness of the rubber rings 5 and 6, resulting in corresponding restoring forces. The force required for deformation depends on inner parameters, such as the dimensions and the Shore hardness of the rubber rings as well as on the dimensions of the surrounding structural elements producing the bias of the rubber rings.

Part of the deformation work of the rubber is transformed into heat whereby damping is obtained.

The rubber ring 5 has a smaller diameter than the rubber ring 6. Both rubber rings serve as radial seals of a cavity 25 formed between them and limited in axial direction by opposed front end surfaces 26, 27 of the rings 2, 8. This cavity 25 is adapted to be pressurized through a line 28 and a passageway 29 formed in the outer ring 8 and admitting pressure fluid, preferably pressurized air.

The inner ring 2 has a lower part 21 with which it is connected by screws 22. At three equally spaced locations around the circumference a stop pin 30 each provided with a conical head 31 is taken up in a bearing sleeve 32 for sliding movement and is secured against rotation by means of a wedge 33. The axial position of the stop pin is adjustable by a setscrew 34 against the force of a pile of plate springs 36 supported at one end on the bearing sleeve 32 and at the other end on the stop pin, with the plate springs 36 disposed in between. Upon adjustment the adjusted position of the setscrew 34 and thus of the stop pin 30 can be fixed by means of a lock nut 38.

The conical head 31 of the stop pin 30 is positioned opposite a corresponding conical receiving element 37 at the underside of the outer ring 8.

By means of the rubber rings 5, 6 the suspension means can accommodate not only axial movements but also limited angular movements of the instrument 1 in circumferential direction with respect to the central axis 20.

If the suspension means described is to be blocked, pressurized air is introduced into the cavity 25. This causes the inner ring 2 with its lower part 21 to be moved in the manner of a piston in axial direction, i.e. upwardly in FIG. 1, against the resilient force of the rubber ring 6 which is being pressed against the frustoconical surface 23 of ring 7. This unloads rubber ring 5. The bias of the rubber rings and the frictional force acting between the supporting surfaces and the rubber are so designed that the air pressure cannot displace the rubber rings 5, 6. The inner ring 2 is moved upwardly until the three stop pins 30 which are equally spaced around the circumference engage the conical receiving elements 37 by their conical heads 31 so that the inner ring 2 and thus the instrument 1 will be blocked in circumferential direction and in axial direction with respect to the outer rings 7, 8 and thus also with respect to the carrier 17.

The adjustment described above (adjusting and locking the setscrews 34) may be effected when the suspension means is blocked as described above. In this context the individual adjustability permits optimum fixing of the position.

Figure 2:
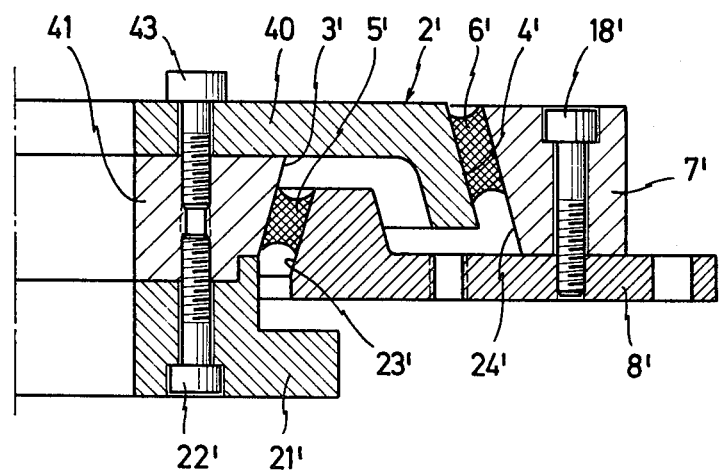
FIG. 2 is an axial part sectional view of a modified preferred embodiment of the invention.

In the embodiment shown in FIG. 2 members which have the same function as corresponding members in FIG. 1 are indicated by a prime accent. This FIG. shows only the part of the modified suspension means which corresponds to the right half of FIG. 1. The modification resides in the fact that the rubber rings 5', 6' are vulcanized to the inner ring 2' and the outer rings 7', 8'. This renders the production less expensive and facilitates the assembly. For instance, the steps 12, 13 and shoulders 14, 15 may be dispensed with in this embodiment. Blocking is effected by the same means and in the same manner as described with reference to FIG. 1. Conveniently, the upper part of the inner ring 2' is divided into two ring parts 40, 41.

The suspension means described are readily adaptable to the respective requirements by corresponding selection of the dimensions and rubber properties.

What we claim is:

1. A suspension means for mounting on a movable carrier an instrument or the like which is susceptible to shock, said means comprising:
   flexible sealing means adapted to absorb shocks in at least one direction, said flexible sealing means including two coaxial, radially spaced rubber-elastic sealing rings which are biased between the annular surfaces of an inner ring connected with the instrument and an outer ring connected with the carrier, said inner and outer rings being disposed to radially define a fluid pressure cavity which controls the axial spacing of said sealing rings; and
   a blocking device adjustable against the resiliency of the sealing means in the axial direction for rigidly coupling the instrument with the carrier.

2. The suspension means of claim 1 wherein said blocking device includes a plurality of stop pins substantially equally spaced around the periphery of said inner ring and engageable with one of a plurality of corresponding receiving elements in said outer ring to limit the relative axial movement of said inner and outer rings.

3. The suspension means of claim 2 wherein each of said stop pins is guided for axial sliding movement in a bearing sleeve carried by said inner ring; and
wherein each of said stop pins is individually adjustable in the axial direction.

4. The suspension means of claim 1 wherein said sealing rings are received in force lock between frustoconical surfaces of said inner and outer rings for rolling movement in response to relative axial movement between said inner and outer rings.

5. The suspension means of claim 4 wherein said inner ring is divided in a radial plane; and
   wherein said sealing rings are vulcanized to the annular surfaces of said inner and outer rings.

6. The suspension means of claim 1 wherein said sealing rings are received in force lock between frustoconical surfaces of said inner and outer rings for rolling movement in response to relative axial movement between said inner and outer rings.

7. The suspension means of claim 5 wherein said inner ring is divided in a radial plane; and
   wherein said sealing rings are vulcanized to the annular surfaces of said inner and outer rings.

8. Vibration resistant mounting means comprising:
   an inner ring having a pair of radially outward facing surfaces;
   an outer ring axially spaced from said inner ring and having a pair of radially inward facing surfaces, one of said outward facing surfaces being radially outside of one of said inward facing surfaces; and
   a pair of resilient sealing rings disposed one each between a radially inward and a radially outward facing surface of said rings.

9. The mounting means of claim 8 including means for selectively varying the axial spacing between said inner and outer rings.

10. Vibration resistant mounting means comprising:
    an inner ring having a pair of radially outward facing surfaces;
    an outer ring axially spaced from said inner ring and having a pair of radially inward facing surfaces;
    a pair of resilient sealing rings disposed one each between a radially inward and radially outward facing surface of said rings; and
    means for selectively varying the axial spacing between said rings including means for pressurizing the cavity defined by the radially outward surface of said inner ring, the radially inward facing surface of said outer ring and said sealing rings.

11. The suspension means of claim 10 wherein said surfaces are generally parallel frustoconical surfaces whereby the likelihood of rolling contact between said surfaces and said sealing rings is enhanced.

12. The suspension means of claim 11 including means for limiting the axial spacing between said inner and outer rings.

13. The suspension means of claim 10 wherein said sealing rings are secured to said surfaces whereby rolling contact between said surfaces and said sealing rings is substantially eliminated.

14. The suspension means of claim 13 wherein said inner and outer rings are configured to vary the radial spacing between at least one pair of surfaces as a function of the axial spacing between said inner and outer rings.

15. Vibration resistant mounting means comprising:
    an inner ring having a pair of radially outward facing surfaces;
    an outer ring axially spaced from said inner ring and having a pair of radially inward facing surfaces; and a pair of resilient sealing rings disposed one each between a radially inward and a radially outward facing surface of said rings, said surfaces being generally parallel frustoconical surfaces whereby the likelihood of rolling contact between said surfaces and said sealing rings is enhanced.

16. The suspension means of claim 15 wherein said inner and outer rings are configured to vary the radial spacing between at least one pair of surfaces as a function of the axial spacing between said inner and outer rings.

17. The suspension means of claim 8 wherein said sealing rings are secured to said surfaces whereby rolling contact between said surfaces and said sealing rings is substantially eliminated.

18. The suspension means of claim 8 including means for limiting the axial spacing between said inner and outer rings.

19. The suspension means of claim 8 including means for limiting relative rotation of said inner and outer rings about the axis thereof.

20. A suspension means for mounting an instrument or the like which is susceptible to shock on a movable carrier, said means comprising:

two coaxial, radially spaced rubber-elastic sealing rings biased between the annular surfaces of an inner ring connected with the instrument and an outer ring defining an anular cavity and connected with the movable carrier, said two sealing rings being adapted to absorb shocks in at least one direction and a blocking device comprising a servo drive means operatively communicating with said anular cavity to urge said inner and outer rings away from each other against the resiliency of said sealing rings in said at least one direction for rigidly coupling the instrument with said carrier.

21. A suspension means for mounting an instrument or the like which is susceptible to shock on a movable carrier, said means comprising:

two coaxial, radially spaced rubber-elastic sealing rings biased between the annular surfaces of an inner ring connected with the instrument and an outer ring defining an anular cavity and connected with the movable carrier, said two sealing rings being adapted to absorb shocks in at least one direction and a blocking device comprising a servo drive means operatively communicating with said anular cavity to urge said inner and outer rings away from each other against the resiliency of said sealing rings in said at least one direction for rigidly coupling the instrument with said carrier, said blocking device further comprising adjustable stop pins equally spaced around the periphery of said inner ring for engagement with corresponding receiving elements in the outer ring assembly under the action of said servo drive means.

* * * * *